(12) United States Patent
He

(10) Patent No.: US 11,856,539 B2
(45) Date of Patent: Dec. 26, 2023

(54) METHOD AND DEVICE FOR TRANSMITTING DOWNLINK CONTROL INFORMATION

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 430 days.

(21) Appl. No.: 17/306,227

(22) Filed: May 3, 2021

(65) Prior Publication Data

US 2021/0258901 A1    Aug. 19, 2021

Related U.S. Application Data

(63) Continuation of application No. PCT/CN2018/113831, filed on Nov. 2, 2018.

(51) Int. Cl.
*H04W 56/00* (2009.01)
*H04W 72/0446* (2023.01)
(Continued)

(52) U.S. Cl.
CPC ..... *H04W 56/001* (2013.01); *H04W 72/0446* (2013.01); *H04W 72/23* (2023.01); *H04W 72/30* (2023.01)

(58) Field of Classification Search
CPC ........... H04W 56/001; H04W 72/0446; H04W 72/23; H04W 72/30; H04L 5/003;
(Continued)

(56) References Cited

U.S. PATENT DOCUMENTS 11,219,062 B2 * 1/2022 Jeon ...................... H04L 5/0051
11,706,697 B2 * 7/2023 Xu ......................... H04L 5/0048
370/329

(Continued)

FOREIGN PATENT DOCUMENTS

| CN | 108401526 A | 8/2018 |
| CN | 108513362 A | 9/2018 |
| WO | 2018171924 A1 | 9/2018 |

OTHER PUBLICATIONS

The international search report of PCT application No. PCT/CN2018/113831, dated Jul. 31, 2019.
(Continued)

*Primary Examiner* — Wutchung Chu
(74) *Attorney, Agent, or Firm* — Ladas & Parry LLP

(57) ABSTRACT

The present application discloses a method and device for transmitting downlink control information, which may implement an effective transmission of an SSB on an unlicensed spectrum. The method includes: determining, by a network device, a first control resource set capable of being used by the network device among M control resource sets, where the M control resource sets correspond to Y candidate SSB positions on an unlicensed carrier; and sending, by the network device, first downlink control information on a resource of the first control resource set, where the first downlink control information is used to determine an SSB position where at least one SSB in X SSBs is sent among the Y SSB positions, where M, Y and X are all positive integers, and $1 \leq X < Y$, $M \leq Y$.

20 Claims, 6 Drawing Sheets

(51) Int. Cl.
  *H04W 72/23*   (2023.01)
  *H04W 72/30*   (2023.01)
(58) Field of Classification Search
  CPC ... H04L 5/0048; H04L 5/0053; H04L 5/0094;
    H04L 27/0006; H04L 5/001
  See application file for complete search history.

(56) References Cited

U.S. PATENT DOCUMENTS

| | | | |
|---|---|---|---|
| 2020/0053670 A1* | 2/2020 | Jung | H04W 56/00 |
| 2020/0059927 A1* | 2/2020 | Sun | H04W 56/0015 |
| 2020/0084752 A1* | 3/2020 | Åström | H04W 72/51 |
| 2021/0007086 A1* | 1/2021 | Liu | H04L 5/0053 |
| 2021/0250936 A1* | 8/2021 | Liu | H04L 5/0048 |
| 2022/0039158 A1* | 2/2022 | Awadin | H04W 72/23 |

OTHER PUBLICATIONS

Vivo; "Discussion on physical DL channel design in unlicensed spectrum", 3GPP TSG RAN WG1 Meeting #94, R1-1808235; Gothenburg, Sweden, Aug. 20-24, 2018; (Aug. 24, 2018).

The EESR of corresponding European application No. 18938 553.7, dated Nov. 9. 2021.

Huawei et al:" Initial access in NR unlicensed", 3GPP Draft; R1-1805920, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018 May 11, 2018(May 11, 2018). XP051461630.

* cited by examiner

METHOD AND DEVICE FOR TRANSMITTING DOWNLINK CONTROL INFORMATION

CROSS-REFERENCE TO RELATED APPLICATION

This application is a continuation of International Application No. PCT/CN2018/113831, filed on Nov. 2, 2018, the disclosure of which is hereby incorporated by reference in its entirety.

TECHNICAL FIELD

Embodiments of the present application relate to the field of communications, and more specifically, to a method and device for transmitting downlink control information.

BACKGROUND

A 5th generation mobile communication technology (5G) system or New Radio (NR) system supports data transmission on an unlicensed spectrum. When a communication device communicates on an unlicensed spectrum, it needs to be based on the principle of Listen Before Talk (LBT). That is, before sending a signal on a channel in an unlicensed spectrum, it needs to perform channel detection first, and only when a channel detection result is that the channel is idle, the signal can be sent; if the channel detection result on the unlicensed spectrum is that the channel is busy, the signal cannot be sent.

Considering the uncertainty of obtaining a right to use a channel on the unlicensed spectrum, a position where a Synchronizing Signal/PBCH Block (SSB or SS/PBCH Block) is transmitted on the unlicensed spectrum is also uncertain. How to determine the position of the SSB transmitted on the unlicensed spectrum becomes an urgent problem to be solved.

SUMMARY

Embodiments of the present application provides a method and device for transmitting downlink control information, so that a terminal device can effectively obtain the position where the SSB is transmitted on the unlicensed spectrum.

In a first aspect, a method for transmitting downlink control information is provided, including: determining, by a network device, a first control resource set that is capable of being used by the network device among M control resource sets, where the M control resource sets correspond to Y candidate SSB positions on an unlicensed carrier; and sending, by the network device, first downlink control information on a resource of the first control resource set, where the first downlink control information is used to determine an SSB position where at least one SSB in X SSBs is sent among the Y SSB positions, where M. Y and X are all positive integers, and $1 \le X < Y$, $M \le Y$.

In a second aspect, a method for transmitting downlink control information is provided, including: determining, by a network device, a first SSB position that can be used by the network device among Y candidate SSB positions on an unlicensed carrier; and sending, by the network device, a first SSB at the first SSB position, where a remaining minimum system information RMSI scheduled by a physical broadcast channel PBCH in the first SSB includes first downlink information, the first downlink information is used to determine an SSB position where at least one SSB in X SSBs is sent among the Y SSB positions, where Y and X are both positive integers, and $1 \le X < Y$.

In a third aspect, a method for transmitting downlink control information is provided, including: receiving, by a terminal device, first downlink control information on a resources of a first control resource set in M control resource sets, where the M control resource sets correspond to Y candidate SSB positions on an unlicensed carrier; and determining, by the terminal device, according to the first downlink control information, an SSB position where at least one SSB in X SSBs is transmitted among the Y SSB positions, where M, Y and X are all positive integers, and $1 \le X < Y$, $M \le Y$.

In a fourth aspect, a method for transmitting downlink control information is provided, including: receiving, by a terminal device, a first SSB at a first SSB position among Y candidate SSB positions on an unlicensed carrier, where an RMSI scheduled by a PBCH in the first SSB includes first downlink information; and determining, by the terminal device, according to the first downlink information, an SSB position where at least one SSB in X SSBs is transmitted among the Y SSB positions, where Y and X are both positive integers, and $1 \le X < Y$.

In a fifth aspect, a network device is provided, where the network device can execute the method in the above first aspect or any implementation of the first aspect. Specifically, the network device may include a functional module for executing the method in the above first aspect or any possible implementation of the first aspect.

In a sixth aspect, a network device is provided, where the network device can execute the method in the above second aspect or any implementation of the second aspect. Specifically, the network device may include a functional module for executing the method in the above second aspect or any possible implementation of the second aspect.

In a seventh aspect, a terminal device is provided, where the terminal device can execute the method in the above third aspect or any implementation of the third aspect. Specifically, the terminal device may include a functional module for executing the method in the above third aspect or any possible implementation of the third aspect.

In an eighth aspect, a terminal device is provided, where the terminal device can execute the method in the above fourth aspect or any implementation of the fourth aspect. Specifically, the terminal device may include a functional module for executing the method in the above fourth aspect or any possible implementation of the fourth aspect.

In a ninth aspect, a network device is provided, including a processor and a memory, where the memory is configured to store a computer program, the processor is configured to call and run the computer program stored in the memory to execute the method in the above first aspect or any possible implementation of the first aspect, or execute the method in the above second aspect or any possible implementation of the second aspect.

In a tenth aspect, a terminal device is provided, including a processor and a memory, where the memory is configured to store a computer program, the processor is configured to call and run the computer program stored in the memory to execute the method in the above third aspect or any possible implementation of the third aspect, or execute the method in the above fourth aspect or any possible implementation of the fourth aspect.

In an eleventh aspect, a chip is provided for implementing the method in the above first aspect or any possible implementation of the first aspect, or the method in the above second aspect or any possible implementation of the second aspect. Specifically, the chip includes a processor configured to call and run a computer program from a memory to cause a device installed with the chip installed to execute the method in the above first aspect or any possible implementation of the first aspect, or execute the method in the above second aspect or any possible implementation of the second aspect.

In a twelfth aspect, a chip is provided for implementing the method in the above first aspect or any possible implementation of the first aspect, or the method in the above second aspect or any possible implementation of the second aspect. Specifically, the chip includes a processor configured to call and run a computer program from a memory to cause a device installed with the chip executes the method in the above third aspect or any possible implementation of the third aspect, or execute the method in the above fourth aspect or any possible implementation of the fourth aspect.

In a thirteenth aspect, a computer-readable storage medium is provided, which is configured to store a computer program, where the computer program causes a computer to execute the method in the above first aspect or any possible implementation of the first aspect, or execute the method in the above second aspect or any possible implementation of the second aspect.

In a fourteenth aspect, a computer-readable storage medium is provided, which is configured to store a computer program, where the computer program causes a computer to execute the method in the above second aspect or any possible implementation of the second aspect, or execute the method in the above fourth aspect or any possible implementation of the fourth aspect.

In a fifteenth aspect, a computer program product is provided, including computer program instructions, where the computer program instructions cause a computer to execute the method in the above first aspect or any possible implementation of the first aspect, or execute the method in the above second aspect or any possible implementation of the second aspect.

In a sixteenth aspect, a computer program product is provided, including computer program instructions, where the computer program instructions cause a computer to execute the method in the above third aspect or any possible implementation of the third aspect, or execute the method in the above fourth aspect or any possible implementation of the fourth aspect.

In a seventeenth aspect, a computer program is provided, which, when run on a computer, cause a computer to execute the method in the above first aspect or any possible implementation of the first aspect, or execute the method in the above second aspect or any possible implementation of the second aspect.

In an eighteenth aspect, a computer program is provided, which, when run on a computer, cause a computer to execute the method in the above third aspect or any possible implementation of the third aspect, or execute the method in the above fourth aspect or any possible implementation of the fourth aspect.

In a nineteenth aspect, a communication system is provided, including a network device and a terminal device,
  where the network device is configured to: determine a first control resource set capable of being used by the network device among M control resource sets, where the M control resource sets correspond to Y candidate SSB positions on an unlicensed carrier; and send first downlink control information on a resource of the first control resource set, where the first downlink control information is used to determine an SSB position where at least one SSB in X SSBs is sent among the Y SSB positions, where M, Y and X are all positive integers, and $1 \leq X < Y$, $M \leq Y$;
  where the terminal device is configured to: receive the first downlink control information on the resources of the first control resource set in the M control resource sets, where the M control resource sets correspond to the Y candidate SSB positions on the unlicensed carrier; and determine, according to the first downlink control information, the SSB position where the at least one SSB in the X SSBs is transmitted among the Y SSB positions, where M, Y and X are all positive integers, and $1 \leq X < Y$, $M \leq Y$.

In a twentieth aspect, a communication system is provided, including a network device and a terminal device,
  where the network device is configured to: determine a first SSB position that can be used by the network device among Y candidate SSB positions on an unlicensed carrier; and send a first SSB at the first SSB position, where an RMSI scheduled by a physical broadcast channel PBCH in the first SSB includes first downlink information, the first downlink information is used to determine an SSB position where at least one SSB in X SSBs is sent among the Y SSB positions, where Y and X are both positive integers, and $1 \leq X < Y$,
  where the terminal device is configured to: the terminal device receives the first SSB at the first SSB position among the Y candidate SSB positions on the unlicensed carrier, where the RMSI scheduled by the physical broadcast channel PBCH in the first SSB received at the first SSB position includes the first downlink information; and the terminal device determines, according to the first downlink information, the SSB position where the at least one SSB in the X SSBs is transmitted among the Y SSB positions, where Y and X are both positive integers, and $1 \leq X < Y$.

Through the above technical solution, the number of SSB positions in a DRS transmission window is greater than the number of SSB actually sent by the network device, the network device can flexibly indicate the position where the SSB is actually transmitted within the DRS transmission window through the downlink control information, so that the terminal device can obtain the transmission position of the SSB according to the downlink control information, and thereby performing the rate matching of the downlink data reception correctly.

DESCRIPTION OF EMBODIMENTS

The technical solutions in the embodiments of the present application will be described hereunder with reference to accompanying drawings. Obviously, the described embodiments are a part of embodiments of the present application, rather than all of them. Based on the embodiments of the present application, all other embodiments obtained by persons of ordinary skill in the art without making any creative effort shall fall within the protection scope of the present application.

Technical solutions of embodiments of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced long term evolution (LTE-A) system, a New Radio (NR) system, an evolution system of the NR system, a LTE-based access to unlicensed spectrum (LTE-U) system, a NR-based access to unlicensed spectrum (NR-U) system, a Universal Mobile Telecommunication System (UMTS), a Worldwide Interoperability for Microwave Access (WiMAX) communication system, a Wireless Local Area Networks (WLAN), a Wireless Fidelity (Wi-Fi), a next-generation communication systems, or other communication systems.

In general, the number of connections supported by a traditional communication system is limited, and it is also easy to implement. However, with a development of communication technologies, the mobile communication system will not only support traditional communication, but also support, for example, Device to Device (D2D) communication, Machine to Machine (M2M) communication, Machine Type Communication (MTC), and Vehicle to Vehicle (V2V) communication, or the like, and embodiments of the present application may also be applied to these communication systems.

In an implementation, a communication system in the embodiments of the present application may be applied to a Carrier Aggregation (CA) scenario, or may be applied to a Dual Connectivity (DC) scenario, and may also be applied to a Standalone (SA) network construction scenario.

Figure 1:
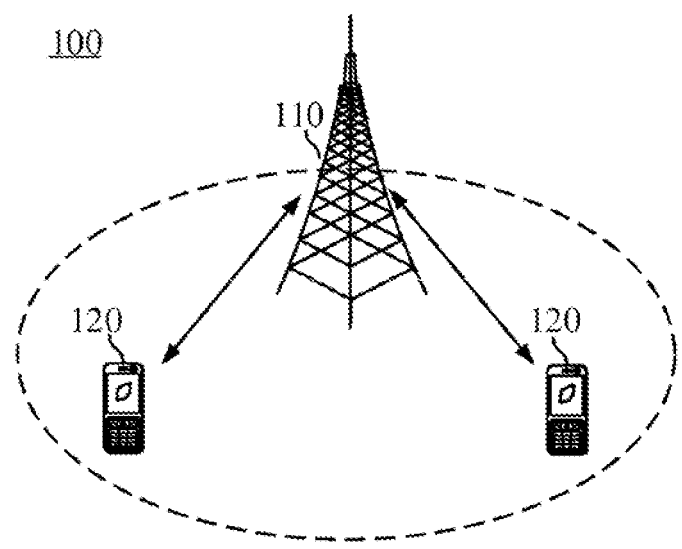
FIG. 1 is a schematic diagram of a possible wireless communication system applied by an embodiment of the present application.

A communication system 100 applied by an embodiment of the present application is shown in FIG. 1. The wireless communication system 100 may include a network device 110. The Network device 110 may be a device communicating with a terminal device. The network device 110 may provide communication coverage for a particular geographic area and may communicate with a terminal device located within the coverage area. In an implementation, the network device 100 may be a Base Transceiver Station (BTS) in a GSM system or a CDMA system, or may be a NodeB (NB) in a WCDMA system, or may be an Evolutional Node B (eNB or eNodeB) in an LTE system, or a network side device in the NR system, or a wireless controller in a Cloud Radio Access Network (CRAN), or the network device may be a relay station, an access point, a vehicle-mounted device, a wearable device, a network-side device in a next-generation network, or a network device in a future evolved Public Land Mobile Network (PLMN).

The wireless communication system 100 also includes at least one terminal device 120 located within a coverage of the network device 110. The "terminal device" as used herein includes, but is not limited to, connected via a wired line, such as connection via a Public Switched Telephone Networks (PSTN), a Digital Subscriber Line (DSL), a digital cable, a direct cable; and/or another data connection/network; and/or via a wireless interface, such as for a cellular network, a Wireless Local Area Network (WLAN), a digital television network such as a DVB-H network, a satellite network, an AM-FM broadcast transmitter; and/or an apparatus of another terminal device configured to receive/transmit a communication signal; and/or an Internet of Things (IoT) device. A terminal device configured to communicate via a radio interface may be referred to as a "wireless communication terminal", "wireless terminal" or "mobile terminal".

The terminal device 120 may be mobile or fixed. In an implementation, the terminal device 120 may refer to an access terminal, a user equipment (UE), a subscriber unit, a subscriber station, a mobile station, a mobile table, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, a vehicle-mounted device, a wearable device, a terminal devices in the future 5G network, or a terminal device in the future evolved PLMN, or the like. In an implementation, Device to Device D2D communication may be implemented among terminal devices 120.

Specifically, the network device 110 may provide a service for a cell, and the terminal device 120 communicates with the network device 110 by using a transmission resource (for example, a frequency domain resource, or a spectrum resource) used by the cell, the cell may be a cell corresponding to the network device 110 (for example, a base station), the cell may belong to a macro base station, or may belong to a base station corresponding to a small cell, and the small cell may include: a metro cell, a micro cell, a pico cell, or a femto cell, or the like. These small cells have features of small coverage and low transmission power, which are suitable for providing a high-speed data transmission service.

FIG. 1 illustratively shows one network device and two terminal devices. In an implementation, the wireless communication system 100 may include a plurality of network devices, and other numbers of terminal devices may be included within the coverage of each network device, which is not limited in the embodiments of the present application. In addition, the wireless communication system 100 may also include other network entities such as a network controller, a mobility management entity, or the like, which is not limited in the embodiment of the present application.

On the unlicensed spectrum, the number of candidate SSB positions used to transmit the SSB within a DRS transmission window (hereinafter referred to as the DRS window) can be greater than the number of SSB actually sent by the network device. In other words, for each DRS window, the network device can determine which SSB position is used to transmit SSB according to a result of LBT in the DRS port. The SSB positions where the SSBs are actually transmitted in different DRS windows may be different. Therefore, the terminal device needs to know the SSB position where the SSB is actually transmitted within the current DRS window.

Therefore, the embodiments of this application proposes that the number of SSB positions in a DRS transmission window is greater than the number of SSB actually sent by the network device, the network device can flexibly indicate a position where the SSB is actually transmitted within the DRS transmission window through the downlink control information, so that the terminal device can obtain the transmission position of the SSB according to the downlink control information, and thereby performing the rate matching of the downlink data reception correctly.

In the embodiments of the present application, the position where the SSB is transmitted is referred to as "SSB position" for short, and each SSB position can transmit one SSB.

Figure 2:
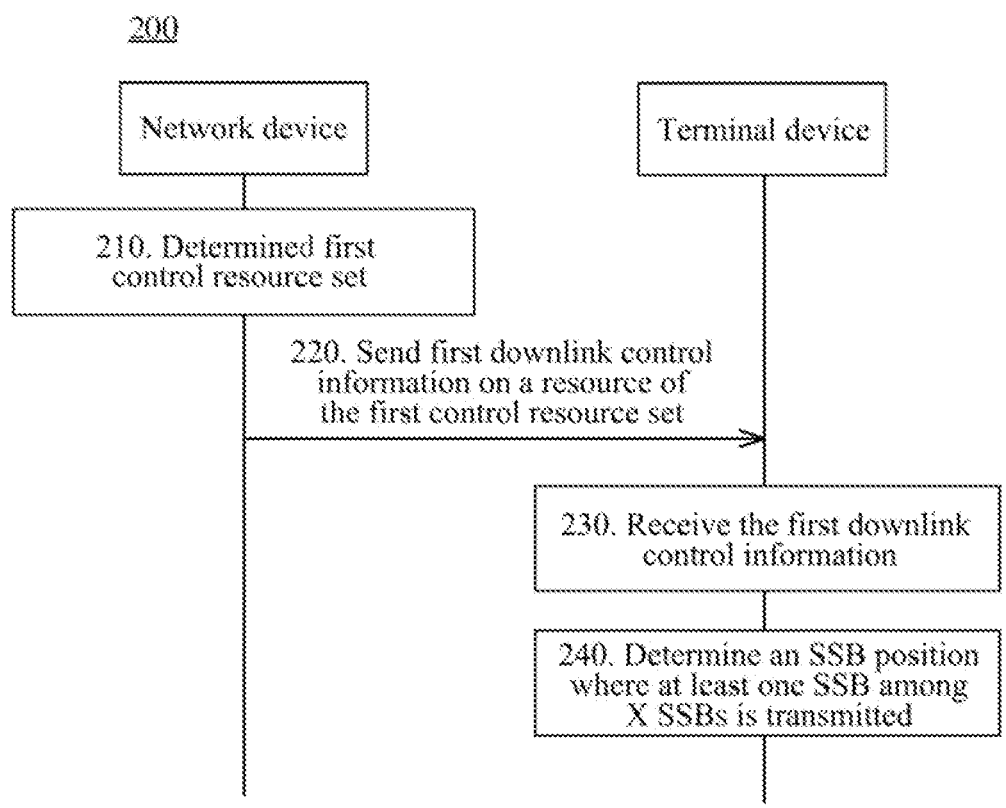
FIG. 2 is a flow interaction diagram of a method for transmitting downlink control information according to an embodiment of the present application.

FIG. 2 is a flow interaction diagram of a method 200 for transmitting downlink control information according to an embodiment of the present application. The method described in FIG. 2 can be executed by a network device and a terminal device. The terminal device may be, for example, the terminal device 120 shown in FIG. 1. The network device may be, for example, the network device 110 shown in FIG. 1. As shown in FIG. 2, the method 200 for transmitting downlink control information may include some or all of the following steps.

In 210, the network device determines a first control resource set capable of being used by the network device among M control resource sets.

In 220, the network device sends first Download Control Information (DCI) on a resource of the first control resource set.

The M control resource sets correspond to Y candidate SSB positions on an unlicensed carrier, the first downlink control information is used to determine an SSB position where at least one SSB in X SSBs is sent among the Y SSB positions.

In 230, the terminal device receives the first downlink control information on the resource of the first control resource set in the M control resource sets.

In 240, the terminal device determines, according to the first downlink control information, the SSB position where the at least one SSB in the X SSBs is transmitted among the Y SSB positions.

M, Y and X are all positive integers, and $1 \leq X < Y$, $M \leq Y$.

In an implementation, the SSB includes a Primary Synchronization Signal (PSS) and a Secondary Synchronization Signal (SSS). Moreover, in an implementation, the SSB also includes at least one of Physical Broadcast Channel (PBCH), control channel resource set scheduling Remaining Minimum System Information (RMSI), RMSI, Channel Status Information Reference Signal (CSI-RS), Other System Information (OSI), and paging message.

In an implementation, the RMSI can also be considered as System Information Block 1 (SIB1).

It should be understood that X is the number of the SSBs configured by the network device to transmit on the unlicensed spectrum. The first control resource set can be located in either a licensed carrier or an unlicensed carrier. For example, the first control resource set is located on an unlicensed carrier used to send SSB, or may be located on another unlicensed carrier not used to send SSB.

When the first control resource set is located on an unlicensed carrier, the first control resource set is a control resource set that it is determined that the network device obtains a right to use a channel (for example, determining that a channel on the unlicensed carrier is idle through LBT). After obtaining the right to use the channel, the network device may select one or more control resource sets from the multiple control resource sets obtain the right to use the channel to transmit the first downlink control information.

When the number K of SSB positions obtain the right to use the channel in the DRS window is greater than or equal to X, the frst downlink control information is used to determine the SSB positions used to transmit the X SSBs among the Y SSB positions; if the number K of SSB positions obtain the right to use the channel in the DRS window is less than X, the first downlink control information may indicate the SSB positions used to transmit the K SSBs among the Y SSB positions, then the remaining SSB may not be transmitted or transmitted in the subsequent DRS window. That is to say, the first downlink control information in each DRS window is used to determine the SSB position where the SSB is actually transmitted in the DRS window.

The M control resource sets are, for example, M Control Resource Sets (CORESETs). A correspondence between the M control resource sets and the Y candidate SSB positions can be preset, for example, agreed in advance by a protocol, or is configured by the network device. The network device may also notify the terminal device of the correspondence.

In an implementation, M<Y, the M control resource sets include a second control resource set, and the second control resource set corresponds to at least two SSB positions. The at least two SSB positions correspond to the second control resource set may be located in a same time unit or different time units. The time unit includes, for example, a time slot, a subframe, and a fixed duration such as within 1 ms.

In an implementation, M>Y, the Y SSB positions include a second SSB position, where the second SSB position corresponds to at least two control resource sets. For example, when the control resource set is located on an unlicensed carrier, one SSB position may correspond to multiple control resource sets. The network device may transmit the first downlink control information through at least one control resource set of the multiple control resource sets, thereby improving a transmission probability of the first downlink control information.

In an implementation, M=Y, the M control resource sets have a one-to-one correspondence with the Y SSB positions.

In other words, the correspondence between the M control resource sets and the Y SSB positions may be that each control resource set corresponds to multiple SSB positions; may also be that each control resource set corresponds to one SSB position; may further be that the M control resource sets may include not only a control resource set corresponding to multiple SSB positions, but also include a control resource set corresponding to one SSB position.

In the following, in conjunction with FIGS. 3(a) and 3(b), cases where M<Y and M=Y are respectively described.

Figure 3A:
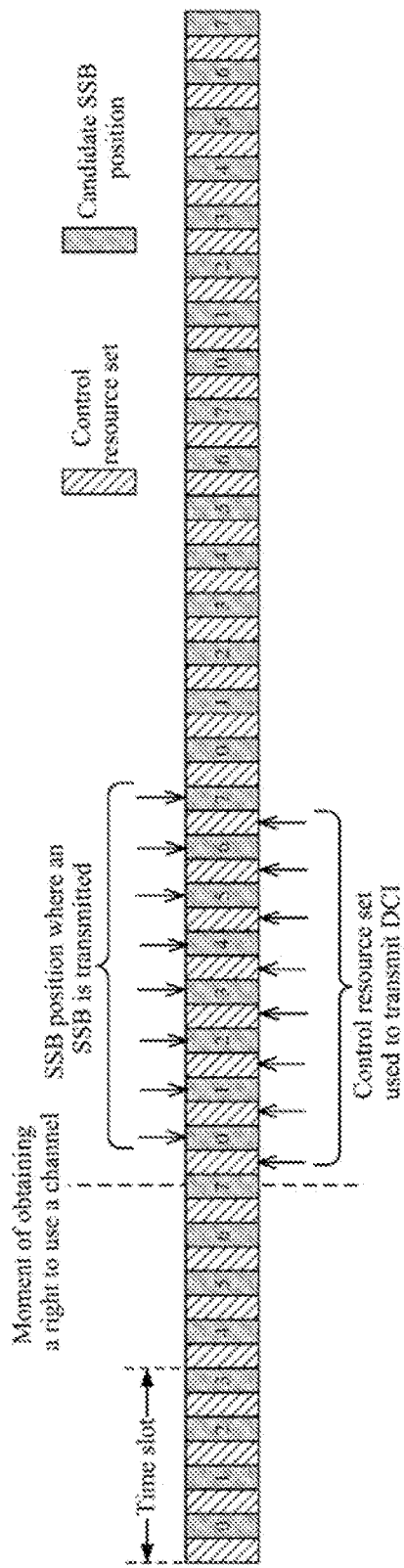
FIG. 3(a) is a schematic diagram of candidate SSB positions and control resource sets according to an embodiment of the present application.
Figure 3B:
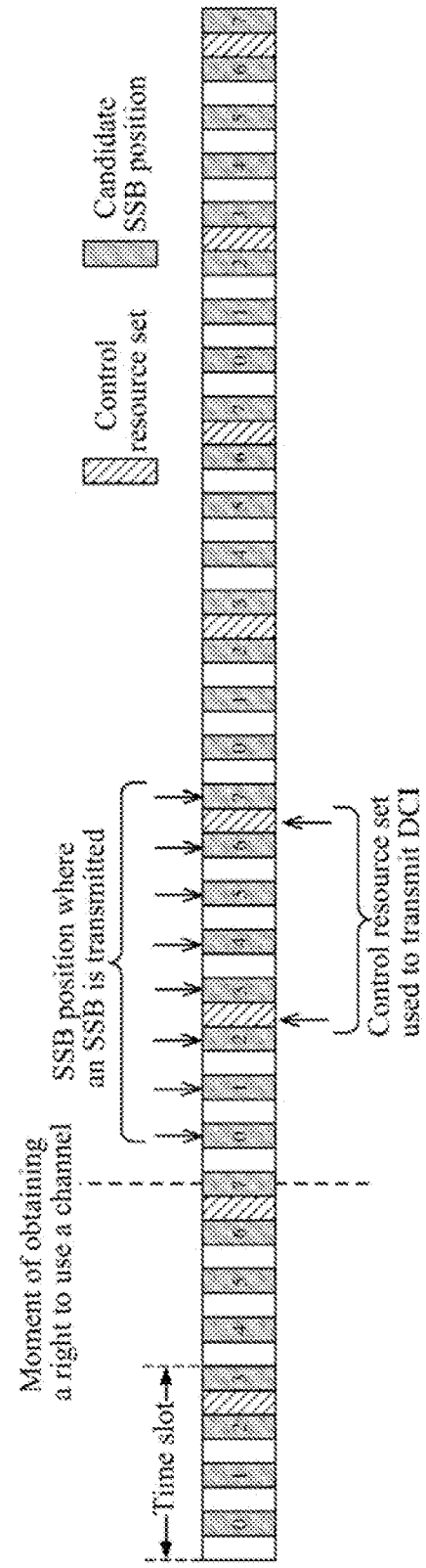
FIG. 3(b) is a schematic diagram of an SSB transmission according to an embodiment of the present application.

As shown in FIGS. 3(a) and 3(b), it is assumed that a DRS window includes M control resource sets and Y candidate SSB positions, and it is assumed M=Y=32, X=8. In FIG. 3(a), the M control resource sets have a one-to-one correspondence with Y SSB positions, and each control resource set corresponds to its adjacent SSB position. In FIG. 3(b), each of the M control resource sets corresponds to 4 SSB positions, that is, each control resource set corresponds to SSB positions in a time slot. For example, the first control resource set corresponds to 4 SSB positions in a time slot where it is located.

In addition, the SSB sent at each SSB position is not an arbitrary SSB, but an SSB corresponding to the SSB position. There is a correspondence between a candidate SSB position and an SSB index, or there is a Quasi-Co-Position (QCL) relationship between different SSB positions. The candidate SSB position can be agreed by a protocol or configured by the network device. The candidate SSB positions shown in FIGS. 3(a) and 3(b) are marked with a serial number of the SSB position. SSB positions with the serial same number can be used to send SSBs with QCL relationship. The positions with different serial numbers correspond to SSBs with different indexes, where each candidate SSB position is used to send the corresponding SSB. For example, in FIGS. 3(a) and 3(b), SSB position 0 corresponds to SSB #0. Therefore, each SSB position 0 is used to send SSB #0, or in other words, the SSB sent at SSB position 0 has a QCL relationship. SSB position 1 corresponds to SSB #1. Therefore, each SSB position 1 is used to send SSB #1, or in other words, the SSB sent on SSB position 1 has a QCL relationship. SSB position 2 corresponds to SSB #2. Therefore, each SSB position 2 is used to send SSB #2, or in other words, the SSB sent at SSB position 2 has a QCL relationship. Similarly, SSB position 3, SSB position 4, SSB position 5, SSB position 6, and SSB position 7 correspond to SSB #3, SSB #4, SSB #5, SSB #6, and SSB #7, respectively. Such correspondence may be agreed by a protocol or configured by the network device. Each SSB is only sent at its corresponding SSB position. Among them, #0 to #7 represent SSB indexes.

After the network device obtains the right to use the channel, for example, through LBT, one or more control resource sets can be selected from the control resource sets with the right to use the channel to transmit the first downlink control information. In the embodiment of the present application, the control resource set that obtains the right to use the channel is also referred to as "useable control resource set", which corresponds to "control resource set transmitting DC" in the following figures. The SSB position that obtains the right to use the channel is also referred to as "usable SSB position", which corresponds to the "SSB position transmitting SSB" in the following figures. The network device may select the first control resource set from the control resource sets capable of sending DCI shown in FIG. 3(a) or 3(b), and send the first downlink control information in the first control resource set.

X SSBs can be SSBs to be transmitted by the network device. The network device may send X SSBs in the current DRS window, or may send part of the X SSBs in the DRS window. For example, referring to FIGS. 3 (a) and (b), X=8, "1" means sending, and "0" means not sending. The network device can be configured with "1 1 1 1 1 1 1 1" to mean sending all SSBs, or can be configured with "0 0 0 0 1 1 1 1" to mean sending SSB #4, SSB #5, SSB #6, SSB #7.

In an implementation, the method further includes: the network device sends second downlink control information at a first SSB position corresponding to the first control resource set. Correspondingly, the terminal device receives the second downlink control information at the first SSB position corresponding to the first control resource set. The second downlink control information is used by the terminal device to determine the first control resource set.

The first SSB position may include one or more SSB positions. The second downlink control information sent at the first SSB position may indicate a position of the first control resource set used to send the first downlink control information, for example, indicating a time domain position, a frequency domain position, a search space or other parameters of the first control resource set.

In an implementation, the second downlink control information may be carried on a Physical Broadcast Channel (PBCH) in an SSB transmitted at the first SSB position.

In short, the PBCH transmitted at the first SSB position carries the second downlink control information. The second downlink control information is used to indicate the position of the first control resource set corresponding to the first SSB position. The resource of the first control resource set are used to transmit the first downlink control information. The first downlink control information indicates the SSB position where the SSB is actually transmitted.

For example, the network device selects the first SSB position with the right to use the channel, and sends the corresponding first SSB on the first SSB. The first SSB includes, for example, PSS, SSS, and PBCH. The PBCH may indicate the control resource set used to transmit a Physical Downlink Control Channel (PDCCH). The PDCCH transmitted through the resource in the control resource set can be used to transmit the first downlink control information. The first downlink control information indicates the SSB position actually transmitting the SSB. Further, the PDCCH can also be used to schedule PDSCH, the PDSCH carries RMSI information.

In this way, the PDCCH used to schedule the existing RMSI transmission is used to indicate the SSB position actually transmitting the SSB, thereby reducing the complexity of blindly detecting the PDCCH by the terminal device.

Figure 4A:
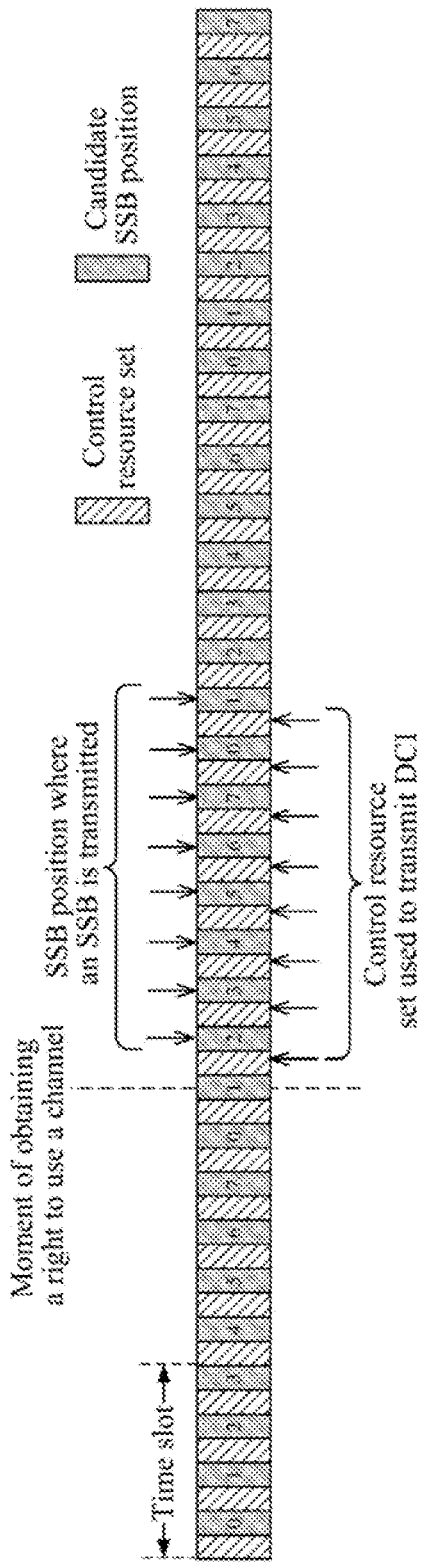
FIG. 4(a) is a schematic diagram of candidate SSB positions and control resource sets according to an embodiment of the present application.
Figure 4B:
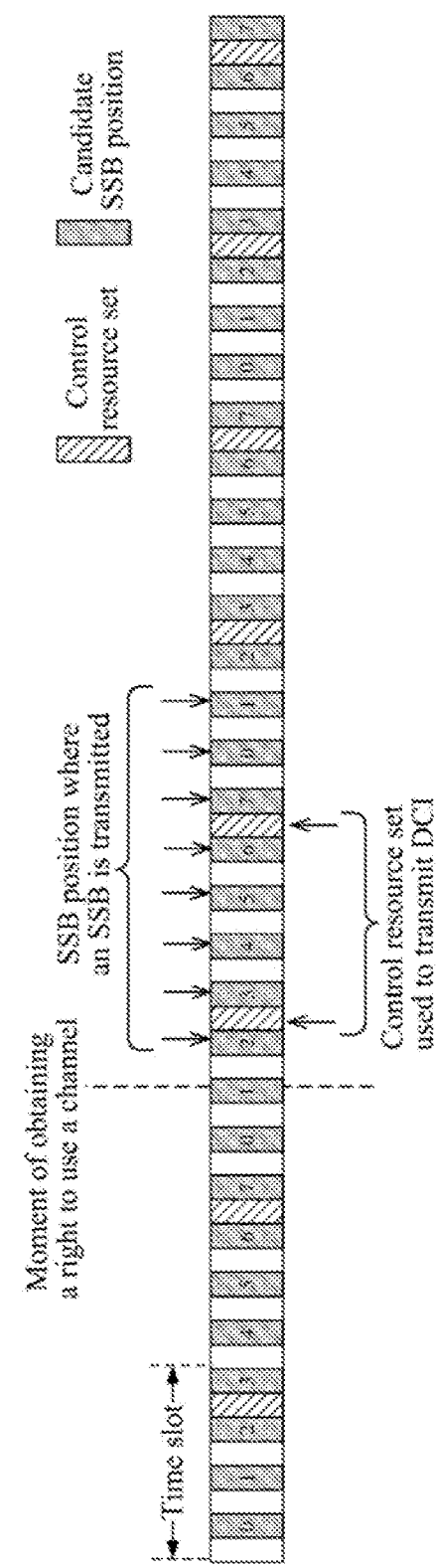
FIG. 4(b) is a schematic diagram of an SSB transmission according to an embodiment of the present application.

The following describe how the first downlink control information indicates the SSB position where at least one SSB among the X SSBs is transmitted in the Y candidate SSB positions in the embodiment of the present application with reference to FIGS. 4(a) and 4(b).

In an implementation method, the first downlink control information may include at least one of the following:
    an SSB position where the at least one SSB is transmitted among the Y SSB positions;
    a first SSB position where an SSB is transmitted among the Y SSB positions;
    a last SSB position where an SSB is transmitted among the Y SSB positions;

an index of an SSB transmitted at first among the Y SSB positions;

an index of an SSB transmitted at last among the Y SSB positions;

a position of the SSB transmitted at first in the at least one SSB among the X SSBs among the Y SSB positions;

a position of the SSB transmitted at last in the at least one SSB among the X SSBs among the Y SSB positions; and a position of an SSB, which is transmitted at a first SSB position corresponding to the first control resource set, in the at least one SSB among the X SSBs.

According to the number X of SSBs to be transmitted and the above-mentioned at least one kind of information, the terminal device can determine which position have transmitted the SSB.

For example, as shown in FIGS. 4(a) and 4(b), it is assumed that a DRS window includes M control resource sets and Y candidate SSB positions, and it is assumed that Y=32 and X=8. In FIG. 4(a), the M control resource sets have a one-to-one correspondence with Y SSB positions, and each control resource set corresponds to its adjacent SSB position. In FIG. 4(b), each of the M control resource sets corresponds to 4 SSB positions, that is, each control resource set corresponds to SSB positions in a time slot. The 32 SSB positions are divided into 4 groups of SSB positions (denoted as group 0, group 1, group 2 and group 3). Each group of SSB positions includes SSB position 0 to SSB position 7, which can be used to send SSB #0 to SSB #7, respectively.

Similarly, there is a correspondence between a candidate SSB position and an SSB index, or there is a QCL relationship between different SSB positions. In FIGS. 4(a) and 4(b), SSB positions with the same number can be used to send SSBs with QCL relationship, where the SSB indexes with QCL relationship can be the same or different, which is not limited in the embodiment of the present application. For example, SSB position 0 is used to send SSB #0; SSB position 1 is used to send SSB #1; SSB position 2 is used to send SSB #2, and so on.

After the network device obtains the right to use the channel, the first control resource set can be selected from the control resource sets with the right to use the channel to transmit the first downlink control information. The first downlink control information may include 5 bits, where 2 bits (for example, the first 2 bits) are used to indicate in which set of SSB positions the first SSB of the X SSBs is transmitted, the remaining 3 bits are used to indicate the first SSB position where the SSB is transmitted in the group of SSB positions. Taking FIGS. 4(a) and 4(b) as an example, it is assumed that the first downlink control information includes 0 1 0 1 0. According to the first two bits, the terminal device can know that a position where the first SSB of the X SSBs is actually transmitted is in group 1. According to the last three bits, the terminal device can determine that a starting position for transmission of the X SSBs is SSB position 2 in group 1. Since X=8, the SSB position where the SSB is actually transmitted includes SSB #2, SSB #3, SSB #4, SSB #5, SSB #6, SSB #7 in group 1, and SSB #0, SSB #1 in group 2.

For another example, referring to FIGS. 4(a) and 4(b), the first downlink control information may include 3 bits. These 3 bits are used to indicate an SSB transmitted at first among the X SSBs, and it is assumed that the first SSB position corresponding to the first control resource set is the SSB position where the SSB is actually transmitted. It is assumed that the first downlink control information includes 0 1 0, it means that the SSB transmitted at first is SSB #2, the corresponding SSB position is SSB position 2, and the first SSB position is SSB position 6 in group 1. Since X=8, the terminal device can determine that the SSB position where the SSB is actually transmitted includes SSB #2, SSB #3, SSB #4, SSB #5, SSB #6, SSB #7 in group 1 (the group to which the first SSB position belongs) and SSB #O and SSB #1 in group 2.

For another example, referring to FIGS. 4(a) and 4(b), the first downlink control information may include 3 bits. These 3 bits are used to indicate an SSB transmitted at last among the X SSBs, and it is assumed that the first SSB position corresponding to the first control resource set is the SSB position where the SSB is actually transmitted. It is assumed that the first downlink control information includes 0 0 1, it means that the SSB transmitted at last is SSB #1, the corresponding SSB position is SSB position 1, and the first SSB position is SSB position 6 in group 1. Since X=8, the terminal device can determine that the SSB position where the SSB is actually transmitted includes SSB #2, SSB #3, SSB #4, SSB #5, SSB #6, SSB #7 in group 1 (the group to which the first SSB position belongs) and SSB #0 and SSB #1 in group 2.

For another example, referring to FIGS. 4(a) and 4(b), the first downlink control information may include 3 bits. These 3 bits are used to indicate a position of the SSB transmitted at the first SSB position corresponding to the first control resource set in the at least one SSB. It is assumed that the SSB transmitted at the first SSB position is SSB6 in group 1, and the position of SSB6 in the eight SSBs is the fifth, then the terminal device can determine that the SSB position where SSB is actually transmitted includes SSB #2, SSB #3, SSB #4, SSB #5, SSB #6, SSB #7 in group 1 (the group to which SSB #6 belongs) and SSB #0 and SSB #1 in group 2.

It should be understood that the above description is based on an example where the first downlink control information indicates the SSB position where the SSB is actually transmitted, but the present application is not limited to this. The first downlink control information can also implicitly or indirectly indicate these SSB positions. For example, the first downlink control information may indicate a candidate SSB positions where no SSB is transmitted, or indicate the SSB positions used for other downlink transmissions.

In another implementation method, the first downlink control information includes a bitmap, the bitmap includes Y bits, and the Y bits have a one-to-one correspondence with the Y SSB positions, where a value on each bit is used to indicate whether a candidate SSB position corresponding to each bit is used to send an SSB.

For example, taking FIG. 4(a) as an example, it is assumed that the first downlink control information is 00000000 00111111 1100000 00000000, it means SSB #2, SSB #3, SSB #4, SSB #5, SSB #6, SSB #7 in group 1, and SSB #) and SSB #1 in group 2 have transmitted the corresponding SSBs.

In the embodiment of the present application, an unused SSB position can be used for other data transmission to improve resource utilization.

In an implementation, the method further includes: the network device sends third downlink control information.

Correspondingly, the method further includes: the terminal device receives the third downlink control information. In 240, the terminal device determines the SSB position where the at least one SSB is transmitted among the Y SSB positions according to the first downlink information and the third downlink control information.

The third downlink control information is used to determine a time slot structure within a Transmission Opportunity (TXOP) to which a first SSB position corresponding to the first control resource set belongs.

Figure 5A:
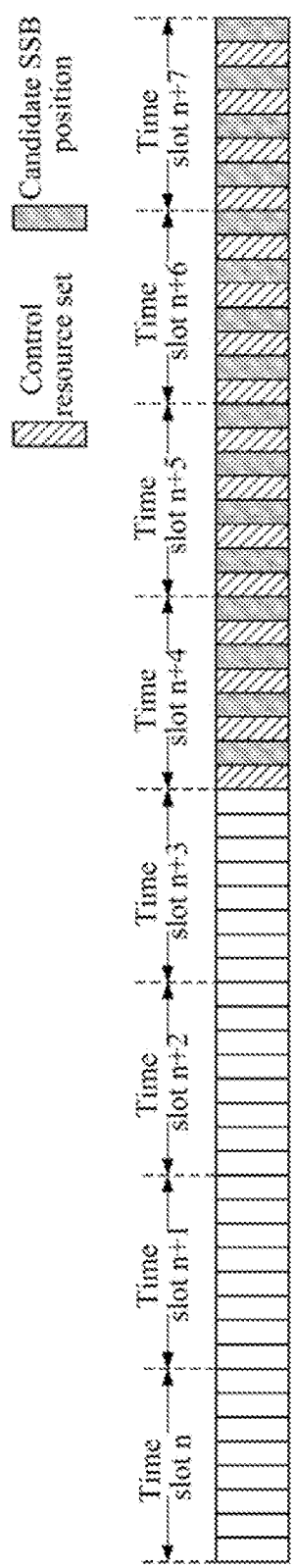
FIG. 5(a) is a schematic diagram of candidate SSB positions and control resource sets according to an embodiment of the present application.
Figure 5B:
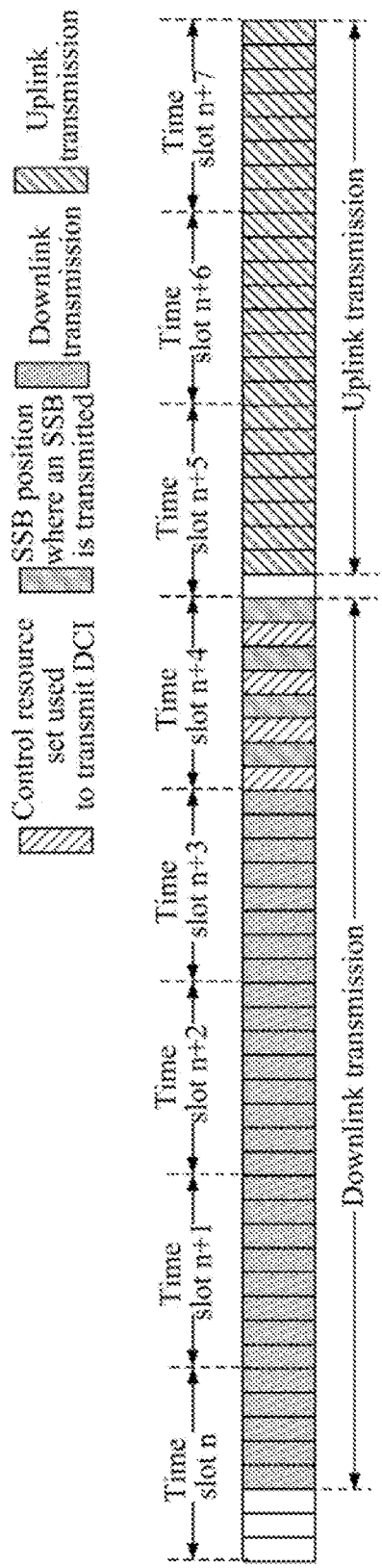
FIG. 5(b) is a schematic diagram of an SSB transmission according to an embodiment of the present application.

With reference to FIGS. 5(a) and 5(b), and taking FIG. 5(a) as an example, it is assumed that a DRS window includes M control resource sets and Y candidate SSB positions, and it is assumed that Y=32 and X=8. The M control resource sets have a one-to-one correspondence with Y SSB positions, and each control resource set corresponds to a subsequent adjacent SSB position. As shown in FIG. 5(a), the candidate SSB positions configured by the network device are located in time slot n+4 to time slot n+7, and each SSB candidate position corresponds to a control resource set. The third control information, such as Slot Frame Indication (SFI) information, can indicate uplink and downlink transmission conditions in time slot n to time slot n+7. For example, it indicates an end position of a downlink subframe. As shown in FIG. 5(b), when the terminal device receives the third control information, it can determine, according to the third control information, that time slot n to time slot n+4 are configured for downlink transmission, while the time slots n+5 to time slot n+7 are configured for uplink transmission. Since only slot n+4 to slot n+7 are configured with candidate SSB positions, and the first downlink control information indicates the candidate SSB positions in time slot n+4 and time slot n+5, with combining the first downlink control information and the third downlink control information, the terminal device can determine that the SSB position where the SSB is actually transmitted is 4 SSB positions in time slot n+4, and the network device sends corresponding SSBs at the 4 SSB positions in the time slot n+4, respectively.

Figure 6:
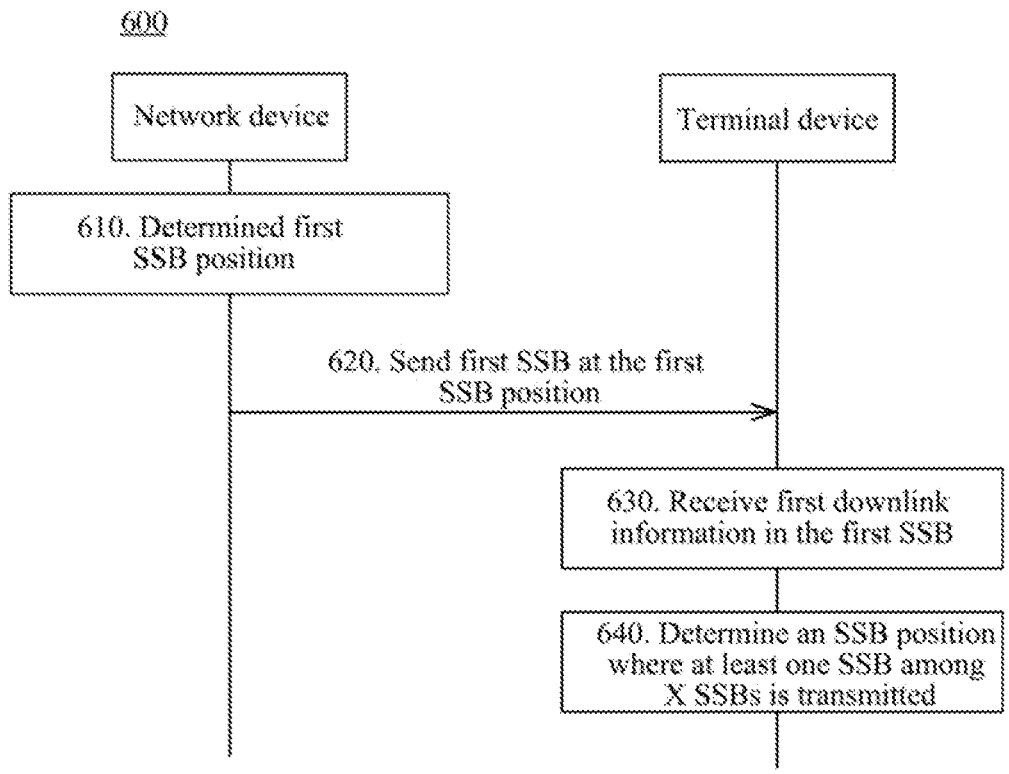
FIG. 6 is a flow interaction diagram of a method for transmitting downlink control information according to another embodiment of the present application.

FIG. 6 is a flow interaction diagram of a method 600 for transmitting downlink control information according to another embodiment of the present application. The method described in FIG. 6 can be executed by a network device and a terminal device. The terminal device may be, for example, the terminal device 120 shown in FIG. 1. The network device may be, for example, the network device 110 shown in FIG. 1. As shown in FIG. 6, the method 600 for transmitting downlink control information may include some or all of the following steps.

In 610, the network device determines a first SSB position that can be used by the network device among Y candidate SSB positions on an unlicensed carrier.

In 620, the network device sends a first SSB at the first SSB position.

A Remaining Minimum System Information (RMSI) corresponding to a PBCH in the first SSB includes first downlink information. The first downlink information is used to indicate an SSB position where at least one SSB in X SSBs is sent among the Y SSB positions.

In 630, the terminal device receives the first SSB at the first SSB position among the Y candidate SSB positions on the unlicensed carrier.

In 640, the terminal device, according to first downlink information included in an RMSI corresponding to a PBCH in the first SSB, determines the SSB position where the at least one SSB in the X SSB positions is transmitted among the Y SSB positions.

Y and X are both positive integers, and 1≤X<Y.

In this embodiment, the network device selects the first SSB position with the right to use the channel, and sends the first SSB on the first SSB. The first SSB includes, for example, a Primary Synchronization Signal (PSS), a Secondary Synchronization Signal (SSS), a PBCH, and so on.

The PBCH can indicate the control resource set used to transmit PDCCH, and the PDCCH transmitted through a resource in the control resource set can be used to schedule PDSCH. The PDSCH carries RMSI information, and the RMSI information is the RMSI information corresponding to the PBCH. The RMSI information includes first downlink information, and the first downlink information indicates an SSB position where at least one SSB is transmitted among the Y SSB positions. According to the RMSI corresponding to the PBCH in the first SSB, the terminal device can obtain the SSB position where the SSB is actually transmitted.

In this way, the existing RMSI is used to indicate the SSB position where the SSB is actually transmitted, which saves the signaling overhead of the downlink control information transmitted on the PDCCH.

In an implementation, the first downlink information includes at least one of the following information: an SSB position where the at least one SSB is transmitted among the Y SSB positions; a first SSB position where an SSB is transmitted among the Y SSB positions; a last SSB position where an SSB is transmitted among the Y SSB positions; an index of an SSB transmitted at first among the Y SSB positions; an index of an SSB transmitted at last among the Y SSB positions; a position of the SSB transmitted at first in the at least one SSB among the X SSBs among the Y SSB positions; a position of the SSB transmitted at last in the at least one SSB among the X SSBs among the Y SSB positions; and a position of an SSB, which is transmitted at a first SSB position corresponding to the first control resource set, in the at least one SSB among the X SSBs.

In an implementation, the first downlink information includes a bitmap, the bitmap includes Y bits, and the Y bits have a one-to-one correspondence with the Y SSB positions, where a value on each bit is used to indicate whether a candidate SSB position corresponding to each bit is used to send an SSB.

It should be understood that how the first downlink control information indicates the SSB position where at least one SSB in the X SSBs is transmitted in the Y candidate SSB positions may make reference to the above related description of the method 200. For brevity, the details are not described herein again.

In an implementation, the method further includes: the network device sends third downlink control information.

Correspondingly, the method further includes: the terminal device receives the third downlink control information; where in 640, the terminal device determines the SSB position where the at least one SSB is transmitted among the Y SSB positions according to the first downlink information and the third downlink control information.

The third downlink control information is used to determine a time slot structure within a TXOP to which the first SSB position belongs.

The third control information may be, for example, SFI information, which is used to indicate the time slot structure within the TXOP to which the first SSB position belongs, that is, uplink and downlink transmission conditions in the TXOP. The network device may send the first downlink information in a time slot configured with a downlink transmission. For details, please refer to the above description of FIGS. 5(a) and 5(b), which will not be repeated here.

It should be noted that, on the premise of no conflict, the various embodiments described in this application and/or the technical features in each embodiment can be combined with each other arbitrarily. The technical solution obtained after the combination should also fall into the protection scope of this application.

It should be noted that, in the case of no collision, each embodiment and/or the technical features in the each embodiment described in the present application may be combined with each other arbitrarily, and the combined technical solutions shall also fall within the protection scope of the present application.

It should be understood that in each embodiment of the present application, the sequence numbers of the above processes do not imply a sequence of executions, and the execution order of the processes should be determined by their functions and an internal logic, and should not constitute any limitation on the implementation process of the embodiments of the present application.

Figure 7:
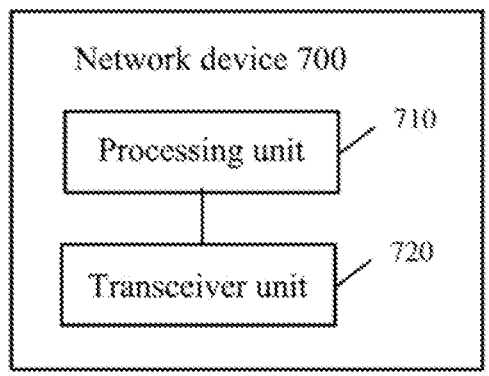
FIG. 7 is a schematic block diagram of a network device according to an embodiment of the present application.

FIG. 7 is a schematic block diagram of a network device 700 according to an embodiment of the present application. As shown in FIG. 7, the network device 700 includes a processing unit 710 and a transceiver unit 720, where:

the processing unit 710 is configured to determine a first control resource set capable of being used by the network device among M control resource sets, where the M control resource sets correspond to Y candidate SSB positions on an unlicensed carrier, and the transceiver unit 720 is configured to send first downlink control information on a resource of the first control resource set, where the first downlink control information is used to determine an SSB position where at least one SSB in X SSBs is sent among the Y SSB positions, where M, Y and X are all positive integers, and 1≤X<Y, M≤Y.

Therefore, the number of SSB positions in a DRS transmission window is greater than the number of SSB actually sent by the network device, the network device can flexibly indicate the actual position where the SSB is transmitted within the DRS transmission window through the downlink control information, so that the terminal device can obtain the transmission position of the SSB according to the downlink control information, and thereby performing the rate matching of the downlink data reception, and realizing the effective use of SSB.

In an implementation, M<Y, the M control resource sets include a second control resource set, and the second control resource set corresponds to at least two SSB positions.

In an implementation, the at least two SSB positions correspond to the second control resource set are located in a same time unit.

In an implementation, M=Y, the M control resource sets have a one-to-one correspondence with the Y SSB positions.

In an implementation, a correspondence between the M control resource sets and the Y SSB positions is preset, or configured by the network device.

In an implementation, the transceiver unit 720 is further configured to: send second downlink control information at a first SSB position corresponding to the first control resource set, where the second downlink control information is used to determine the first control resource set.

In an implementation, the second downlink control information is carried on a physical broadcast channel PBCH in an SSB transmitted at the first SSB position.

In an implementation, the first downlink control information includes at least one of the following information: an SSB position where the at least one SSB is transmitted among the Y SSB positions; a first SSB position where an SSB is transmitted among the Y SSB positions; a last SSB position where an SSB is transmitted among the Y SSB positions; an index of an SSB transmitted at first among the Y SSB positions; an index of an SSB transmitted at last among the Y SSB positions; a position of the SSB transmitted at first in the at least one SSB among the Y SSB positions; a position of the SSB transmitted at last in the at least one SSB among the Y SSB positions; and a position of an SSB, which is transmitted at a first SSB position corresponding to the first control resource set, in the at least one SSB.

In an implementation, the first downlink control information includes a bitmap, the bitmap includes Y bits, and the Y bits have a one-to-one correspondence with the Y SSB positions, where a value on each bit is used to indicate whether a candidate SSB position corresponding to each bit is used to send an SSB.

In an implementation, the transceiver unit 720 is further configured to: send third downlink control information, where the third downlink control information is used to determine a time slot structure within a transmission opportunity TXOP to which a first SSB position corresponding to the first control resource set belongs.

It should be understood that the network device 700 can perform the corresponding operations performed by the network device in the above method 200. For the sake of brevity, details are not described herein again.

Figure 8:
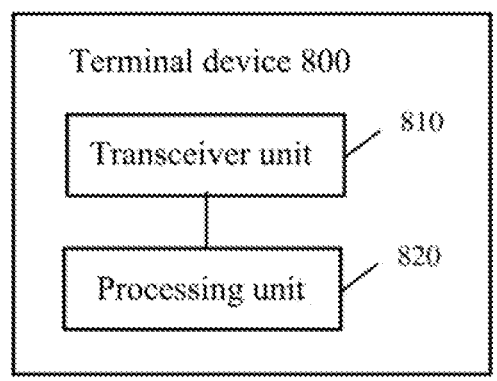
FIG. 8 is a schematic block diagram of a terminal device according to an embodiment of the present application.

FIG. 8 is a schematic block diagram of a terminal device 800 according to an embodiment of the present application. As shown in FIG. 8, the terminal device 800 includes a transceiver unit 810 and a processing unit 820, where:

the transceiver unit 810 is configured to receive first downlink control information on a resources of a first control resource set in M control resource sets, where the M control resource sets correspond to Y candidate SSB positions on an unlicensed carrier; and the processing unit 820 is configured to determine, according to the first downlink control information, an SSB position where at least one SSB in X SSBs is transmitted among the Y SSB positions, where M. Y and X are all positive integers, and 1≤X<Y, M≤Y.

Therefore, the number of SSB positions in a DRS transmission window is greater than the number of SSB actually sent by the network device, the network device can flexibly indicate the actual position where the SSB is transmitted within the DRS transmission window through the downlink control information, so that the terminal device can obtain the transmission position of the SSB according to the downlink control information, and thereby performing the rate matching of the downlink data reception, and realizing the effective use of SSB.

In an implementation, M<Y, the M control resource sets include a second control resource set, and the second control resource set corresponds to at least two SSB positions.

In an implementation, the at least two SSB positions corresponding to the second control resource set are located in a same time unit.

In an implementation, M=Y, the M control resource sets have a one-to-one correspondence with the Y SSB positions.

In an implementation, a correspondence between the M control resource sets and the Y SSB positions is preset, or configured by the network device.

In an implementation, the transceiver unit 810 is further configured to: receive second downlink control information at a first SSB position corresponding to the first control resource set, where the second downlink control information is used to determine the first control resource set.

In an implementation, the second downlink control information is carried on a physical broadcast channel PBCH in an SSB transmitted at the first SSB position.

In an implementation, the first downlink control information includes at least one of the following information: an SSB position where the at least one SSB is transmitted among the Y SSB positions; a first SSB position where an SSB is transmitted among the Y SSB positions; a last SSB position where an SSB is transmitted among the Y SSB positions; an index of an SSB transmitted at first among the Y SSB positions; an index of an SSB transmitted at last among the Y SSB positions; a position of the SSB transmitted at first in the at least one SSB among the Y SSB positions; a position of the SSB transmitted at last in the at least one SSB among the Y SSB positions; and a position of an SSB, which is transmitted at a first SSB position corresponding to the first control resource set, in the at least one SSB.

In an implementation, the first downlink control information includes a bitmap, the bitmap includes Y bits, and the Y bits have a one-to-one correspondence with the Y SSB positions, where a value on each bit is used to indicate whether a candidate SSB position corresponding to each bit is used to transmit an SSB.

In an implementation, the transceiver unit 810 is further configured to: receive third downlink control information, where the third downlink control information is used to determine a time slot structure within a transmission opportunity TXOP to which a first SSB position corresponding to the first control resource set belongs; the processing unit 820 is specifically configured to: determine the SSB position where the at least one SSB is transmitted among the Y SSB positions according to the first downlink control information and the third downlink control information.

It should be understood that the terminal device 800 can perform the corresponding operations performed by the terminal device in the above method 200. For the sake of brevity, details are not described herein again.

Figure 9:
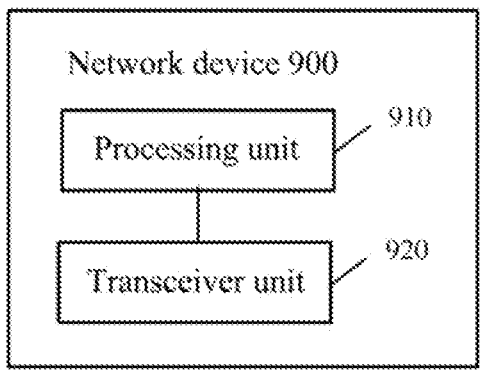
FIG. 9 is a schematic block diagram of a network device according to another embodiment of the present application.

FIG. 9 is a schematic block diagram of a network device 900 according to another embodiment of the present application. As shown in FIG. 9, the network device 900 includes a processing unit 910 and a transceiver unit 920, where:

the processing unit 910 is configured to determine a first SSB position that can be used by the network device among Y candidate SSB positions on an unlicensed carrier; and the transceiver unit 920 is configured to send a first SSB at the first SSB position, where a remaining minimum system information RMSI scheduled by a physical broadcast channel PBCH in the first SSB includes first downlink information, the first downlink information is used to determine an SSB position where at least one SSB in X SSBs is sent among the Y SSB positions, where Y and X are both positive integers, and 1≤X<Y.

Therefore, the existing RMSI is used to indicate the SSB position where the SSB is actually transmitted, which saves signaling overhead.

In an implementation, the first downlink information includes at least one of the following information: an SSB position where the at least one SSB is transmitted among the Y SSB positions; a first SSB position where an SSB is transmitted among the Y SSB positions; a last SSB position where an SSB is transmitted among the Y SSB positions; an index of an SSB transmitted at first among the Y SSB positions; an index of an SSB transmitted at last among the Y SSB positions; a position of the SSB transmitted at first in the at least one SSB among the Y SSB positions; a position of the SSB transmitted at last in the at least one SSB among the Y SSB positions; and a position of an SSB, which is transmitted at the first SSB position, in the at least one SSB.

In an implementation, the first downlink information includes a bitmap, the bitmap includes Y bits, and the Y bits have a one-to-one correspondence with the Y SSB positions, where a value on each bit is used to indicate whether a candidate SSB position corresponding to each bit is used to send an SSB.

In an implementation, the transceiver unit 920 is further configured to: send third downlink control information, where the third downlink control information is used to determine a time slot structure within a transmission opportunity TXOP to which the first SSB position belongs.

It should be understood that the network device 900 can perform the corresponding operations performed by the network device in the above method 600. For the sake of brevity, details are not described herein again.

Figure 10:
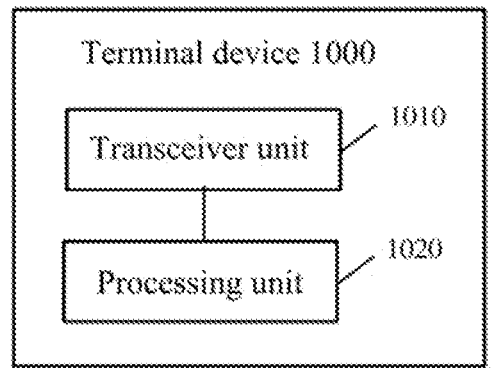
FIG. 10 is a schematic block diagram of a terminal device according to another embodiment of the present application.

FIG. 10 is a schematic block diagram of a terminal device 1000 according to another embodiment of the present application. As shown in FIG. 10, the terminal device 1000 includes a transceiver unit 1010 and a processing unit 1020, where:

the transceiver unit 1010 is configured to receive a first SSB at a first SSB position among Y candidate SSB positions on an unlicensed carrier, where a remaining minimum system information RMSI scheduled by a physical broadcast channel PBCH in the first SSB includes first downlink information; and the processing unit 1020 is configured to determine, according to the first downlink information, an SSB position where at least one SSB in X SSBs is transmitted among the Y SSB positions, where Y and X are both positive integers, and 1≤X<Y.

Therefore, the existing RMSI is used to indicate the SSB position where the SSB is actually transmitted, which saves signaling overhead.

In an implementation, the first downlink information includes at least one of the following information: an SSB position where the at least one SSB is transmitted among the Y SSB positions; a first SSB position where an SSB is transmitted among the Y SSB positions; a last SSB position where an SSB is transmitted among the Y SSB positions; an index of an SSB transmitted at first among the Y SSB positions; an index of an SSB transmitted at last among the Y SSB positions; a position of the SSB transmitted at first in the at least one SSB among the Y SSB positions; a position of the SSB transmitted at last in the at least one SSB among the Y SSB positions; and a position of an SSB, which is transmitted at the first SSB position, in the at least one SSB.

In an implementation, the first downlink information includes a bitmap, the bitmap includes Y bits, and the Y bits have a one-to-one correspondence with the Y SSB positions, where a value on each bit is used to indicate whether a candidate SSB position corresponding to each bit is used to transmit an SSB.

In an implementation, the transceiver unit 1010 is further configured to: receive third downlink control information, where the third downlink control information is used to determine a time slot structure within a transmission opportunity TXOP to which the first SSB position belongs, the processing unit 1020 is specifically configured to: determine the SSB position where the at least one SSB is transmitted among the Y SSB positions according to the first downlink information and the third downlink control information.

It should be understood that the terminal device 1000 can perform the corresponding operations performed by the terminal device in the above method 600. For the sake of brevity, details are not described herein again.

Figure 11:
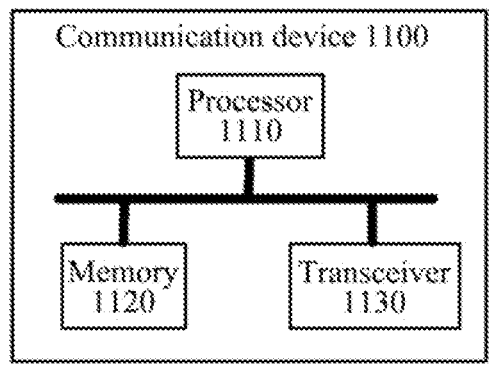
FIG. 11 is a schematic structural diagram of a communication device according to an embodiment of the present application.

FIG. 11 is a schematic structural diagram of a communication device 1100 according to an embodiment of the present application. The communication device may be a terminal. The communication device 1100 shown in FIG. 11 includes a processor 1110 which can call and run a computer program from the memory to implement the methods in embodiments of the present application.

In an implementation, as shown in FIG. 11, the communication device 1100 may further include a memory 1120. The processor 1110 can call and run a computer program from the memory 1120 to implement the methods in embodiments of the present application.

The memory 1120 may be a separate device independent of the processor 1110 or may be integrated in the processor 1110.

In an implementation, as shown in FIG. 11, the communication device 1100 may further include a transceiver 1130, and the processor 1110 can control the transceiver 1130 to communicate with other devices and, in particular, may control the transceiver 1130 to send/receive information or data to/from other devices.

The transceiver 1130 may include a transmitter and a receiver. The transceiver 1130 may further include an antenna, and the number of the antenna may be one or more.

In an implementation, the communication device 1100 may specifically be the network device in any embodiment of the present application, and the communication device 1100 can implement corresponding processes implemented by the network device in the methods of the embodiments of the present application, which, for conciseness, will not be repeated herein.

In an implementation, the communication device 1100 may specifically be the terminal device in the embodiments of the present application, and the communication device 1100 can implement corresponding processes implemented by the terminal device in the methods of the embodiments of the present application, which, for the sake of conciseness, will not be repeated herein.

Figure 12:
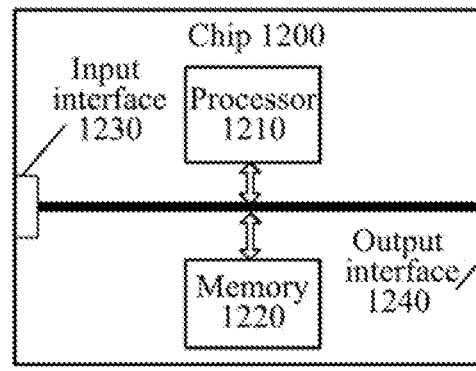
FIG. 12 is a schematic structural diagram of a chip according to an embodiment of the present application.

FIG. 12 is a schematic structural diagram of a chip according to an embodiment of the present application. The chip 1200 shown in FIG. 12 includes a processor 1210 which can call and run a computer program from a memory to implement the methods in embodiments of the present application.

In an implementation, as shown in FIG. 12, the chip 1200 may further include a memory 1220. The processor 1210 can call and run a computer program from the memory 1220 to implement the methods in embodiments of the present application.

The memory 1220 may be a separate device independent of the processor 1210 or may be integrated in the processor 1210.

In an implementation, the chip 1200 may also include an input interface 1230. The processor 1210 can control the input interface 1230 to communicate with other devices or chips. Specifically, information or data sent by other devices or chips can be acquired.

In an implementation, the chip 1200 may also include an output interface 1240. The processor 1210 can control the output interface 1240 to communicate with other devices or chips. Specifically, information or data can be output to other devices or chips.

In an implementation, the chip can be applied to the network device in any embodiment of the present application, and the chip can implement corresponding processes implemented by the network device in the methods in the embodiments of the present application, which, for the sake of conciseness, will not be repeated herein.

In an implementation, the chip can be applied to the terminal device in the embodiments of the present application, and the chip can implement corresponding processes implemented by the terminal device in the methods of the embodiments of the present application, which, for the sake of conciseness, will not be repeated herein.

It should be understood that the chip mentioned in the embodiment of the present application may also be referred to as a system level chip, a system chip, a chip system or a system on chip, or the like.

It should be understood that a processor in an embodiment of the present application may be an integrated circuitry chip capable of processing a signal. In the implementation process, each step of the above method embodiments may be accomplished by an integrated logic circuit of hardware in a processor, or instructions in the form of software. The processor may be a general-purpose processor, a digital signal processor (DSP), an application specific integrated circuit (ASIC), a field programmable gate array (FPGA), or other programmable logic devices, discrete gates or transistor logic devices or discrete hardware components. The methods, steps, and logical block diagrams disclosed in the embodiments of the present application can be implemented or executed. The general purpose processor may be a microprocessor, or the processor may also be any conventional processor or the like. The steps of the method disclosed with reference to the embodiments of the present application may be directly embodied as being accomplished by the execution of the hardware decoding processor or by a combination of hardware and software modules in the processor. The software module may be located in a storage medium readily available in the art, such as a random access memory, a flash memory, a read only memory, a programmable read only memory or an electrically erasable programmable memory, a register, or the like. The storage medium is located in the memory. The processor reads information in the memory and accomplishes the steps of the above methods in combination with the hardware.

It can be understood that the memory in the embodiments of the present application may be a volatile memory or a non-volatile memory, or may include both volatile and non-volatile memories. The non-volatile memory may be a read-only memory (ROM), a programmable ROM (PROM), an erasable PROM (EPROM), an electrically EPROM (EEPROM) or a flash memory. The volatile memory can be a random access memory (RAM) that acts as an external cache. By way of example rather than limitation, RAM of many forms are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memory of the system and method described herein are intended to include, rather than being limited to, these and any other suitable types of memories.

It should be understood that the foregoing memories are examples rather than limitations. For instance, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a direct rambus RAM (DR RAM), or the like. That is, the memories in the embodiments of the present application are intended to include, rather than being limited to, these and any other suitable types of memories.

Figure 13:
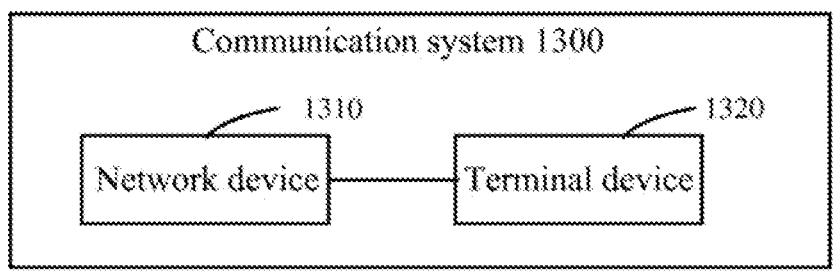
FIG. 13 is a schematic block diagram of a communication system according to an embodiment of the present application.

FIG. 13 is a schematic block diagram of a communication system 1300 according to an embodiment of the present application. As shown in FIG. 13, the communication system 1300 includes a network device 1310 and a terminal device 1320, where the network device 1310 is configured to: determine a first control resource set capable of being used by the network device among M control resource sets, where the M control resource sets correspond to Y candidate SSB positions on an unlicensed carrier; and send first downlink control information on a resource of the first control resource set, where the first downlink control information is used to determine an SSB position where at least one SSB in X SSBs is sent among the Y SSB positions;

the terminal device 1320 is configured to: receive the first downlink control information on the resources of the first control resource set in the M control resource sets, where the M control resource sets correspond to the Y candidate SSB positions on the unlicensed carrier; and determine, according to the first downlink control information, the SSB position where the at least one SSB in the X SSBs is transmitted among the Y SSB positions;

where M, Y and X are all positive integers, $1 \leq X < Y$, $M \leq Y$.

The network device 1310 can be configured to implement the corresponding functions implemented by the network device in the above method 200, and the composition of the network device 1310 can be as shown in the network device 700 in FIG. 7. For the sake of brevity, details are not described herein again.

The terminal device 1320 can be configured to implement the corresponding functions implemented by the terminal device in the above method 200, and the composition of the terminal device 1320 can be as shown in the terminal device 800 in FIG. 8. For the sake of brevity, details are not described herein again.

Figure 14:
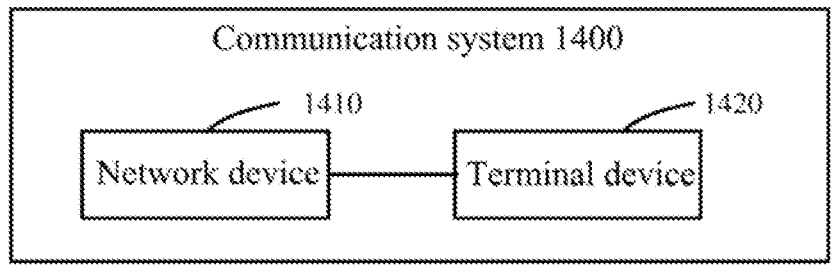
FIG. 14 is a schematic block diagram of a communication system according to another embodiment of the present application.

FIG. 14 is a schematic block diagram of a communication system 1400 according to an embodiment of the present application. As shown in FIG. 14, the communication system 1400 includes a network device 1410 and a terminal device 1420, where:

the network device 1410 is configured to: determine a first SSB position that can be used by the network device among Y candidate SSB positions on an unlicensed carrier; and send a first SSB at the first SSB position, where a remaining minimum system information RMSI scheduled by a physical broadcast channel PBCH in the first SSB includes first downlink information, the first downlink information is used to determine an SSB position where at least one SSB in X SSBs is sent among the Y SSB positions;

the terminal device 1420 is configured to: receive the first SSB at the first SSB position among the Y candidate SSB positions on the unlicensed carrier, where the RMSI scheduled by the physical broadcast channel PBCH in the first SSB received at the first SSB position includes the first downlink information; and determine, according to the first downlink information, the SSB position where the at least one SSB in the X SSBs is transmitted among the Y SSB positions, where Y and X are both positive integers, and $1 \leq X < Y$.

The network device 1410 can be used to implement the corresponding functions implemented by the network device in the above method 600, and the composition of the network device 1410 can be as shown in the network device 900 in FIG. 9. For the sake of brevity, details are not described herein again.

The terminal device 1420 can be used to implement the corresponding functions implemented by the terminal device in the above method 600, and the composition of the terminal device 1420 can be as shown in the terminal device 1000 in FIG. 10. For the sake of brevity, details are not described herein again.

A computer readable storage medium is also provided by an embodiment of the present application for storing a computer program. In an implementation, the computer readable storage medium can be applied to the network device in the embodiments of the present application, and the computer program enables a computer to implement corresponding processes implemented by the network device in the methods in the embodiments of the present application, which, for the sake of conciseness, will not be repeated herein. In an implementation, the computer readable storage medium can be applied to the terminal device in the embodiments of the present application, and the computer program enables a computer to implement corresponding processes implemented by the terminal device in the methods in the embodiments of the present application, which, for the sake of conciseness, will not be repeated herein.

A computer program product is also provided by an embodiment of the present application, including computer program instructions. In an implementation, the computer program product can be applied to the network device in the embodiments of the present application, and the computer program instructions enable a computer to implement corresponding processes implemented by the network device in the methods in the embodiments of the present application, which, for the sake of conciseness, will not be repeated herein. In an implementation, the computer program product can be applied to the terminal device in the embodiments of the present application, and the computer program instructions enable a computer to implement corresponding processes implemented by the terminal device in the methods in the embodiments of the present application, which, for the sake of conciseness, will not be repeated herein.

A computer program is also provided by an embodiment of the present application. In an implementation, the computer program can be applied to the network device in the embodiments of the present application, and the computer program, when executed on a computer, enables the computer to implement corresponding processes implemented by the network device in the methods in the embodiments of the present application, which, for the sake of conciseness, will not be repeated herein. In an implementation, the computer program can be applied to the terminal device in the embodiments of the present application, and the computer program, when executed on a computer, enables the computer to implement corresponding processes implemented by the terminal device in the methods in the embodiments of the present application, which, for the sake of conciseness, will not be repeated herein.

It should be understood that, as used herein, the terms "system" and "network" may be used interchangeably. As used herein, the term "and/or" merely describes a relation between related objects, representing three possible relations. For instance, A and/or B may represent three cases: A alone, A and B together, and B alone. Additionally, as used herein, the symbol "/" typically means the related objects before and after the symbol are in a "or" relation.

It should also be understood that in the embodiments of the present application, "B corresponding to A" indicates that B is associated with A, and B may be determined according to A. However, it should also be understood that determining B according to A does not mean that B is only determined according to A, but that B may also be determined based on A and/or other information.

Those of ordinary skill in the art will appreciate that units and algorithm steps of each example described with reference to the embodiments disclosed herein may be implemented in electronic hardware or a combination of computer software and electronic hardware. Whether these functions are executed in hardware or software depends on the specific application and design constraints of the technical solution. A person skilled in the art may use different methods for implementing the described functions for each specific application, but such implementation should not be considered to be beyond the scope of the present application.

A person skilled in the art may clearly understand that for convenience and brevity of the description, the specific working process of the system, the apparatus and the unit described above may refer to corresponding processes in the foregoing method embodiments, and will not be repeated herein.

In the several embodiments provided by the present application, it should be understood that the disclosed systems, apparatuses, and methods may be implemented in other ways. For example, the apparatus embodiments described above are merely illustrative. For example, the division of the unit is only a logical function division, and there may be other division ways in actual implementation. For example, multiple units or components may be combined or be integrated into another system, or some features may be ignored or not executed. In addition, mutual coupling or direct coupling or communication connection shown or discussed herein may be an indirect coupling or communication connection through some interfaces, apparatuses or units, and may be in the form of electrical, mechanical or otherwise.

The units described as separate components may be or may not be physically separated, and the components displayed as units may be or may not be physical units, that is, they may be located in one place, or may be distributed onto multiple network units. Some or all of the units may be selected according to actual needs to implement the purpose of the solution of the present embodiment.

In addition, each functional unit in the embodiments of the present application may be integrated into one processing unit, or each unit may physically exist independently, or two or more of the above units may be integrated into one unit.

The functions may be stored in a computer readable storage medium if they are implemented in the form of a software functional unit, and sold or used as a standalone product. Based on such understanding, the technical solution of the present application, in essence, or the part contributing to the existing technology or the part of the technical solution may be embodied in the form of a software product, and the computer software product is stored in a storage medium and includes several instructions for enabling a computer device (which may be a personal computer, a server, or a network device, or the like) to perform all or part of the steps described in methods in the embodiments of the present application. The above storage medium includes various media that may store program codes, such as a U disk, a mobile hard disk, a read-only memory (ROM), a random access memory (RAM), a magnetic disk, or an optical disk.

The above is only specific implementation forms of the present application, the protection scope of the present application is not limited thereto, and modifications or substitutions that may easily be derived by those skilled in the art within the technical scope disclosed in the present application should be covered within the protection scope of the present application. Therefore, the protection scope of the present application should be subject to the protection scope of the claims.

What is claimed is:

1. A method for transmitting downlink control information, comprising:
   determining, by a network device, a first control resource set capable of being used by the network device among M control resource sets, wherein the M control resource sets correspond to Y candidate synchronizing signal block (SSB) positions on an unlicensed carrier; and
   sending, by the network device, first downlink control information on a resource of the first control resource set, wherein the first downlink control information is used to determine an SSB position where at least one SSB in X SSBs is sent among the Y SSB positions, wherein M, Y and X are all positive integers, and $1 \leq X < Y$, $M \leq Y$.

2. The method according to claim 1, wherein in a condition that $M<Y$, the M control resource sets comprise a second control resource set, the second control resource set corresponds to at least two SSB positions, and the at least two SSB positions correspond to the second control resource set are located in a same time unit; and
   in a condition that $M=Y$, the M control resource sets have a one-to-one correspondence with the Y SSB positions.

3. The method according to claim 1, further comprising:
   sending, by the network device, second downlink control information at a first SSB position corresponding to the first control resource set, wherein the second downlink control information is used to determine the first control resource set, the second downlink control information is carried on a physical broadcast channel (PBCH) in an SSB transmitted at the first SSB position.

4. The method according to claim 1, wherein the first downlink control information comprises at least one of the following information:
   an SSB position where the at least one SSB is transmitted among the Y SSB positions;
   a first SSB position, which is used to transmit an SSB, among the Y SSB positions;
   a last SSB position, which is used to transmit an SSB, among the Y SSB positions;
   an index of an SSB transmitted at first among the Y SSB positions;
   an index of an SSB transmitted at last among the Y SSB positions;
   a position of the SSB transmitted at first in the at least one SSB among the Y SSB positions;
   a position of the SSB transmitted at last in the at least one SSB among the Y SSB positions; and
   a position of an SSB, which is transmitted at a first SSB position corresponding to the first control resource set, in the at least one SSB.

5. A method for transmitting downlink control information, comprising:
   receiving, by a terminal device, first downlink control information on a resources of a first control resource set in M control resource sets, wherein the M control resource sets correspond to Y candidate synchronizing signal block (SSB) positions on an unlicensed carrier, and determining, by the terminal device, according to the first downlink control information, an SSB position where at least one SSB in X SSBs is transmitted among the Y SSB positions, wherein M, Y and X are all positive integers, and 1≤X<Y, M≤Y.

6. The method according to claim 5, wherein in a condition that M<Y, the M control resource sets comprise a second control resource set, the second control resource set corresponds to at least two SSB positions, and the at least two SSB positions corresponding to the second control resource set are located in a same time unit; and in a condition that M=Y, the M control resource sets have a one-to-one correspondence with the Y SSB positions.

7. The method according to claim 5, further comprising:
receiving, by the terminal device, second downlink control information at a first SSB position corresponding to the first control resource set, wherein the second downlink control information is used to determine the first control resource set, the second downlink control information is carried on a physical broadcast channel (PBCH) in an SSB transmitted at the first SSB position.

8. The method according to claim 5, wherein the first downlink control information comprises at least one of the following information:
an SSB position where the at least one SSB is transmitted among the Y SSB positions;
a first SSB position where an SSB is transmitted among the Y SSB positions;
a last SSB position where an SSB is transmitted among the Y SSB positions;
an index of an SSB transmitted at first among the Y SSB positions;
an index of an SSB transmitted at last among the Y SSB positions;
a position of the SSB transmitted at first in the at least one SSB among the Y SSB positions;
a position of the SSB transmitted at last in the at least one SSB among the Y SSB positions; and
a position of an SSB, which is transmitted at a first SSB position corresponding to the first control resource set, in the at least one SSB.

9. A network device, comprising:
a processor, configured to determine a first control resource set capable of being used by the network device among M control resource sets, wherein the M control resource sets correspond to Y candidate synchronizing signal block (SSB) positions on an unlicensed carrier; and
a transceiver, configured to send first downlink control information on a resource of the first control resource set, wherein the first downlink control information is used to determine an SSB position where at least one SSB in X SSBs is sent among the Y SSB positions, wherein M, Y and X are all positive integers, and 1≤X<Y, M≤Y.

10. The network device according to claim 9, wherein in a condition that M<Y, the M control resource sets comprise a second control resource set, the second control resource set corresponds to at least two SSB positions, and the at least two SSB positions correspond to the second control resource set are located in a same time unit; and in a condition that M=Y, the M control resource sets have a one-to-one correspondence with the Y SSB positions.

11. The network device according to claim 9, wherein the transceiver is further configured to:
send second downlink control information at a first SSB position corresponding to the first control resource set, wherein the second downlink control information is used to determine the first control resource set, the second downlink control information is carried on a physical broadcast channel (PBCH) in an SSB transmitted at the first SSB position.

12. The network device according to claim 9, wherein the first downlink control information comprises at least one of the following information:
an SSB position where the at least one SSB is transmitted among the Y SSB positions;
a first SSB position where an SSB is transmitted among the Y SSB positions;
a last SSB position where an SSB is transmitted among the Y SSB positions;
an index of an SSB transmitted at first among the Y SSB positions;
an index of an SSB transmitted at last among the Y SSB positions;
a position of the SSB transmitted at first in the at least one SSB among the Y SSB positions;
a position of the SSB transmitted at last in the at least one SSB among the Y SSB positions; and
a position of an SSB, which is transmitted at a first SSB position corresponding to the first control resource set, in the at least one SSB.

13. The network device according to claim 9, wherein the first downlink control information comprises a bitmap, the bitmap comprises Y bits, and the Y bits have a one-to-one correspondence with the Y SSB positions, wherein a value on each bit is used to indicate whether a candidate SSB position corresponding to each bit is used to send an SSB.

14. The network device according to claim 9, wherein the transceiver is further configured to:
send third downlink control information, wherein the third downlink control information is used to determine a time slot structure within a transmission opportunity (TXOP) to which a first SSB position corresponding to the first control resource set belongs.

15. A terminal device, comprising:
a transceiver, configured to receive first downlink control information on a resources of a first control resource set in M control resource sets, wherein the M control resource sets correspond to Y candidate synchronizing signal block (SSB) positions on an unlicensed carrier; and
a processor, configured to determine, according to the first downlink control information, an SSB position where at least one SSB in X SSBs is transmitted among the Y SSB positions, wherein M, Y and X are all positive integers, and 1≤X<Y, M≤Y.

16. The terminal device according to claim 15, wherein in a condition that M<Y, the M control resource sets comprise a second control resource set, the second control resource set corresponds to at least two SSB positions, and the at least two SSB positions corresponding to the second control resource set are located in a same time unit; and in a condition that M=Y, the M control resource sets have a one-to-one correspondence with the Y SSB positions.

17. The terminal device according to claim 15, wherein the transceiver is further configured to:
receive second downlink control information at a first SSB position corresponding to the first control resource set, wherein the second downlink control information is used to determine the first control resource set, the second downlink control information is carried on a physical broadcast channel (PBCH) in an SSB transmitted at the first SSB position.

18. The terminal device according to claim 15, wherein the first downlink control information comprises at least one of the following information:
- an SSB position where the at least one SSB is transmitted among the Y SSB positions;
- a first SSB position where an SSB is transmitted among the Y SSB positions;
- a last SSB position where an SSB is transmitted among the Y SSB positions;
- an index of an SSB transmitted at first among the Y SSB positions;
- an index of an SSB transmitted at last among the Y SSB positions;
- a position of the SSB transmitted at first in the at least one SSB among the Y SSB positions;
- a position of the SSB transmitted at last in the at least one SSB among the Y SSB positions; and
- a position of an SSB, which is transmitted at a first SSB position corresponding to the first control resource set, in the at least one SSB.

19. The terminal device according to claim 15, wherein the first downlink control information comprises a bitmap, the bitmap comprises Y bits, and the Y bits have a one-to-one correspondence with the Y SSB positions, wherein a value on each bit is used to indicate whether a candidate SSB position corresponding to each bit is used to transmit an SSB.

20. The terminal device according to claim 15, wherein the transceiver is further configured to:
- receive third downlink control information, wherein the third downlink control information is used to determine a time slot structure within a transmission opportunity (TXOP) to which a first SSB position corresponding to the first control resource set belongs;

the processor is specifically configured to:

determine the SSB position where the at least one SSB is transmitted among the Y SSB positions according to the first downlink control information and the third downlink control information.

* * * * *